United States Patent [19]
Griffith

[11] Patent Number: 5,966,252
[45] Date of Patent: Oct. 12, 1999

[54] BRAVAIS LENS

[75] Inventor: John D. Griffith, Rochester, N.Y.

[73] Assignee: Eastman Kodak Company, Rochester, N.Y.

[21] Appl. No.: 08/961,117

[22] Filed: Oct. 30, 1997

[51] Int. Cl.[6] .................................................. G02B 9/56
[52] U.S. Cl. ........................................... 359/775; 359/642
[58] Field of Search ..................................... 359/642, 775

[56] References Cited

U.S. PATENT DOCUMENTS

| | | | |
|---|---|---|---|
| 4,799,783 | 1/1989 | Takahashi et al. | 351/206 |
| 5,726,814 | 3/1998 | Lidwell | 359/821 |

OTHER PUBLICATIONS

Modern Optical Engineering, The Design of Optical Systems, Second Edition, Warren Smith, pp. 272, 380–382.

*Primary Examiner*—Scott J. Sugarman
*Attorney, Agent, or Firm*—Svetlana Z. Short

[57] ABSTRACT

A Bravais lens includes a front, positive power lens group and a rear, negative power lens group. These lens groups, in combination, provide the Bravais lens with a negative focal length and a negative power. The front, positive power lens group includes a positive power lens element and a negative power lens element. The rear, negative power lens group includes another negative power lens element and another positive power lens element.

14 Claims, 2 Drawing Sheets

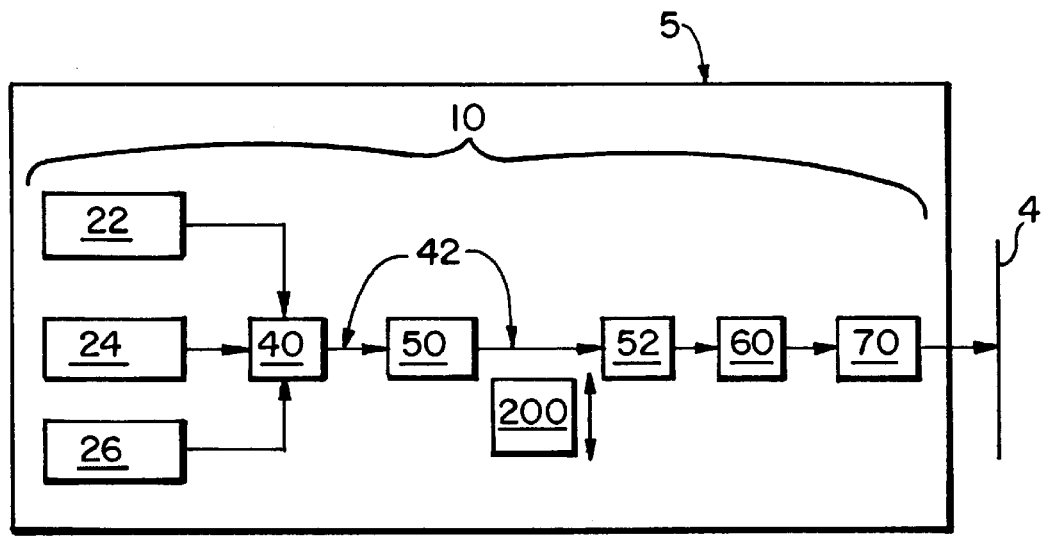
FIG. IA
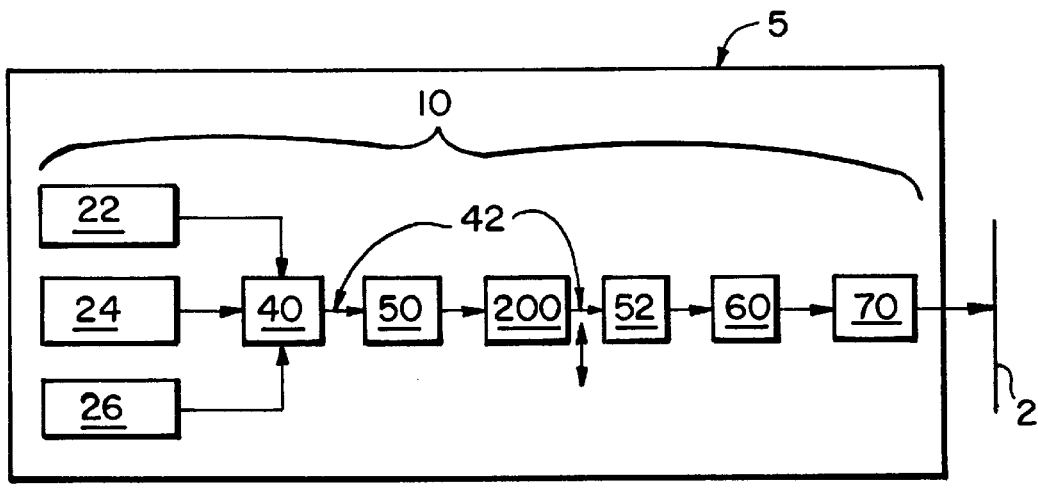
FIG. IB
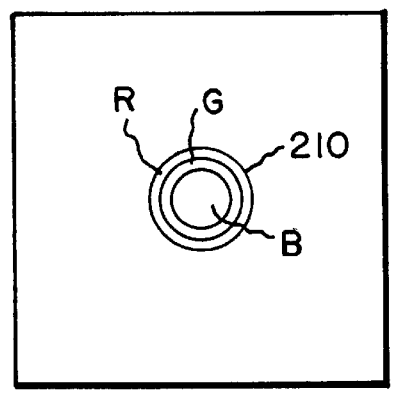
FIG. IC

BRAVAIS LENS

CROSS REFERENCE TO RELATED APPLICATION

This application is related to commonly assigned, copending U.S. Application, Ser. No. 08/960,821, entitled, A Dual Resolution Printer, in the names of John D. Griffith, Badhri Narayan and Michael E. Harrigan, filed concurrently herewith.

FIELD OF THE INVENTION

This invention relates to Bravais lenses.

BACKGROUND OF THE INVENTION

Conventional Bravais lenses provide an enlarged image of a virtual object at the object's location. A Bravais lens is described in the book "Modern Optical Engineering, The Design of Optical Systems", Second Edition, page 272. The Bravais lens described in this book is not an apochromatic lens (i.e., it is not corrected for chromatic aberrations) and thus introduces color aberrations when forming an image. If such a Bravais lens is placed into a composite laser beam containing a plurality of coaxial laser beams of different wavelength, all converging to the same waist location, the Bravais lens would produce a plurality of enlarged laser beam waists. These enlarged laser beam waists would be positioned in different planes along the optical axis of the Bravais lens and thus would not be coplanar.

Further, a Bravais lens described in the above mentioned book is not adapted for use with laser beams. When such Bravais lens is placed into a converging input laser beam to create an image a first laser beam waist, the Bravais lens would produce an second enlarged beam waist at a different location than the first beam waist location. The amount of distance between two beam waist locations will depend on the speed of the input laser beam. Thus, if the beam waists are being reimaged by another optical system to form a final image, the final image may be out of focus when the Bravais lens is placed in front of this optical system.

SUMMARY OF THE INVENTION

An object of the present invention is to provide an improved Bravais lens. Yet another object of the present invention is to provide a Bravais lens capable of being used in a laser printer or in another apparatus that creates images with laser beams. Yet another object of the present invention is to provide an apochromatic Bravais lens.

According to the present invention, a Bravais lens includes a front, positive power lens group and a rear, negative power lens group. These lens groups, in combination, provide the Bravais lens with a negative focal length and a negative power. The front, positive power lens group includes a positive power lens element and a negative power lens element. The rear, negative power lens group includes another negative power lens element and another positive power lens element.

According to one embodiment, the Bravais lens is apochromatic.

Also, according to one embodiment, a Bravais lens comprises at least three lens elements, including at least one positive power lens element and at least one negative power lens element. At least one of these lens elements has an anomalous partial dispersion.

According to one embodiment, at least two of the lens elements of the Bravais lens are symmetrical.

BRIEF DESCRIPTION OF THE DRAWINGS

The foregoing and other objects, features and advantages of the invention as well as presently preferred embodiments thereof will become more apparent from reading the following description in connection with the accompanying drawings:

FIG. 1A is a schematic illustration of a primary optical system with a Bravais lens not inserted into a light beam.

FIG. 1B is a schematic illustration of the primary optical system with the Bravais lens inserted into the light beam.

FIG. 1C is a schematic illustration of a composite beam waist formed by a focusing lens.

DESCRIPTION OF THE PREFERRED EMBODIMENT

Figure 2A:
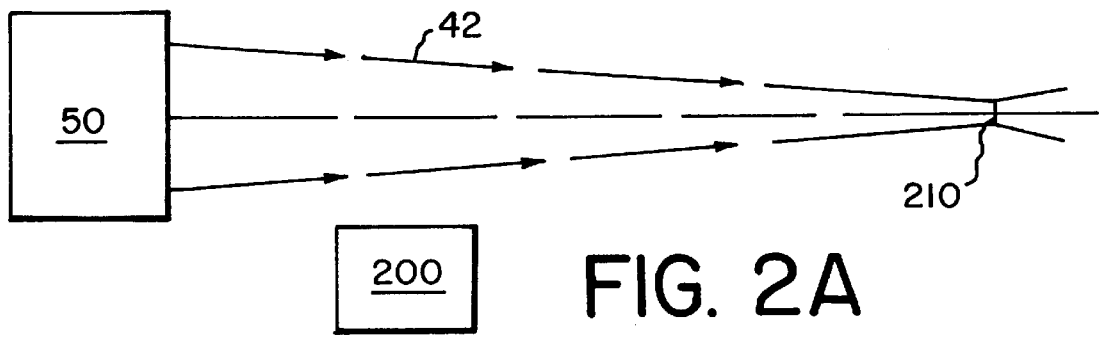
FIGS. 2A and 2B illustrate schematically how the Bravais lens increases the size of a beam waist without altering the location of the beam waist.

It is desirable for a printer to be capable of (i) fast production of good quality photoprints 2, and (ii) slower production of superior quality photoprints 4. To accomplish this, the laser printer 5 (see FIGS. 1A and 1B) of one embodiment of the invention operates in multiple modes where each mode has a different resolution. This change in resolution corresponds to a change in spot size at the print medium. Thus, when the printer 5, operates in a high resolution mode (more dpi) it produces small size spots (0.07 mm at $\lambda=532$ nm) at a print medium. When this same printer operates at higher printing speeds (lower resolution mode, fewer dpi), it produces larger size spots (0.10 mm in diameter, $\lambda=532$ nm) at the print medium. These larger size spots 7 minimize the amount of white space between the exposed pixels. Thus, if the printer 5 is operating at 512 and 350 dpi modes, it can print about twice as fast in a low resolution mode—i.e., the ratio of print speeds is $(512/350)^2$. If the difference between the two resolutions is greater, the printer, when operating in a lower resolution mode can print even faster. For example, the difference in print speed between the 300 dpi mode and the 600 dpi mode is a factor of four, i.e. $(600/300)^2$.

More specifically, the printer 5 includes a primary optical system 10 shown in FIGS. 1A and 1B. This primary optical system 10 comprises laser light sources 22, 24, 26 providing green, red and blue laser light beams, respectively, a fiber-optic multiplexer 40, a focusing lens 50, a beam shaping optics 52, a deflector in the form of a polygon scanner 60 and an f-θ lens 70. The fiber optics multiplexer 40 combines the red, blue and green laser light beams into a single beam 42. The focusing lens 50 intercepts and focuses this single beam 42, converging it and forming a beam waist 210. This beam 210 is a composite beam waist and contains three coplanar waists, red (R), green (G) and blue (B). See FIG. 1C. The commonly assigned copending U.S. application Ser. No. filed concurrently herewith describes the primary optical system 10 in detail.

A Bravais type lens is a lens that forms an image of a (virtual) object at the location of this object. This image may be of a larger or a smaller size than the object. A Bravais lens is a lens that forms an image of a larger size than the object.

According to one embodiment of the present invention, the primary optical system 10 of the laser printer 5 is also provided with an optical unit in the form of a Bravais lens 200 that can be inserted into a converging light beam 42 that exits the focusing lens 50. See FIGS. 1A and 1B.

Figure 2B:
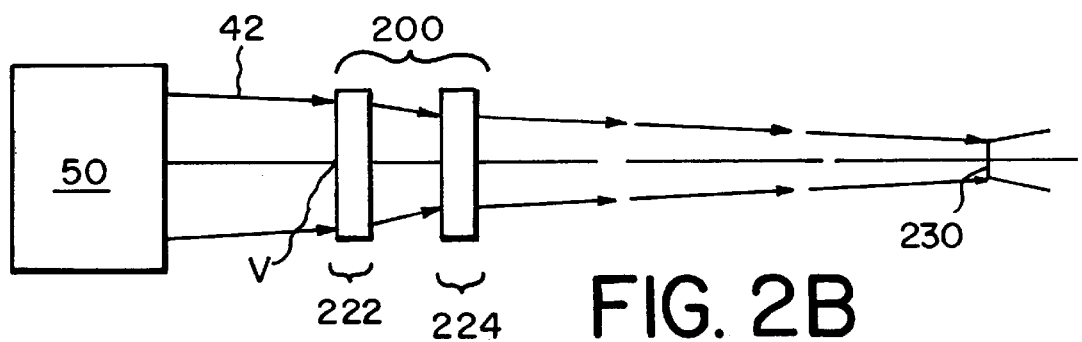

The beam waist 210 serves as a (virtual) object to the Bravais lens 200. The Bravais lens 200 reimages the beam waist 210 and provides a composite beam waist 230 (see FIG. 2B) of increased size (relative to the beam waist 210) at the same position as where the beam waist 210 was located. This is illustrated in FIGS. 2A and 2B.

Because the light beam 42 comprise laser light beams, 210 and 230 beam waists are not a geometric object and image. As stated above, they are laser beam waists. These waists 210 and 230 are formed at locations that are at different longitudinal positions (along the optical axis of the Bravais lens) than the corresponding geometric object and image.

When the Bravais lens 200 is inserted into the light beam 42, the only change seen by the downstream optics (such as the beam shaping optics 52) of the primary optical system 10 is a change in the size of the beam waist formed by the focusing lens 50. This, in turn, changes spot size at the print medium. Because the Bravais lens 200 provides a larger waist size, it is used to increase the size of the spot at the print medium when the printer 5 is used in a low resolution mode. As stated earlier, this increase in spot size minimizes the amount of "white space" between the exposed pixels.

Figure 3:
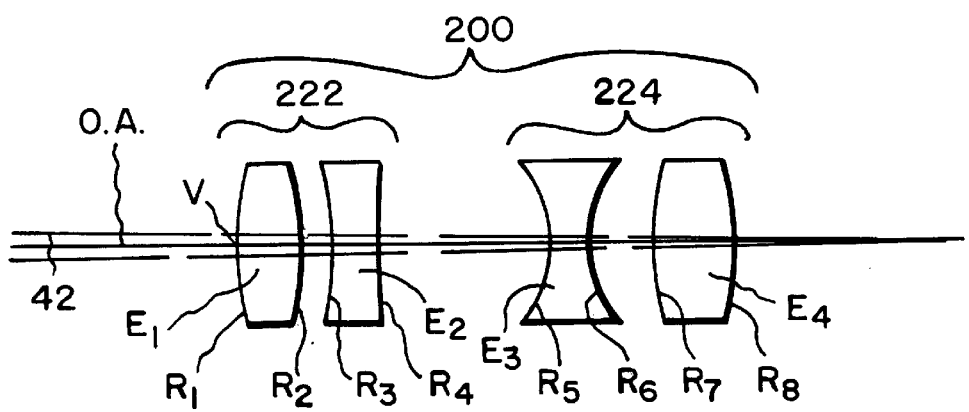
FIG. 3 shows an embodiment of the Bravais lens.

The overall Bravais lens 200 has a negative focal length. The Bravais lens 200 comprises a front positive lens group 222 (facing the focusing lens 50) followed by a negative lens group 224 (FIG. 3). The positive lens group 222 comprises a positive power lens element $E_1$ and a negative power lens element $E_2$. The negative lens group has a negative lens element $E_3$ and a positive element $E_4$.

An embodiment of the Bravais lens 200 used in a printer 5 according to the present invention is set out in detail in Table 1. In this and other embodiments, the "front" of the Bravais lens is the side facing the focusing lens 50 and, the "rear" of the Bravais lens is the image side. The radii of curvature $R_1$ to $R_8$, are numbered from front to rear, the thicknesses and spacings for a surface are the thickness or spacing immediately to the rear of that surface. The indexes of refraction $N_d$ are for the sodium d line of the spectrum wavelength and Vd is the Abbe V-number.

$$\frac{1}{e^2}$$

radius of 0.0179 mm.

More specifically, this Bravais lens 200 is designed to image red, green and blue beam waists into larger beam waists without changing the location these beam waists. This is shown in the table below:

TABLE 2

|  | Input | | Output | |
| --- | --- | --- | --- | --- |
| Wavelength | ωo | Z | ωo | Z |
| 532 mm | .01426 | .000 | .02086 | .000 |
| 457.9 mm | .01298 | −.004 | .01896 | −.005 |
| 685 mm | .01789 | .048 | .02624 | .062 | where ωo is the $$\frac{1}{e^2}$$

radius of a beam waist and Z is the distance from the original (green) beam waist location to beam the waist location formed by the Bravais lens 200. All linear measurements are in millimeters. This table indicates that all of the beam waists are essentially coplanar.

An apochromatic lens is a lens that is free from chromatic aberration. In the printer 5, the three beam waists, one at each of the three wavelengths, are located at the output end of the fiber-optic multiplexer 40. The focusing lens 50 follows the fiber-optic multiplexer 40. The three beams of different wavelengths (red, green and blue light beams) are coaxial when they pass through the focusing lens 50 and the three waists (red, green and blue) forming the beam waist 210, are coplanar. Thus, the Bravais lens 200 must be apochromatic so as not to produce a substantial change in the location of any of the three (red, green and blue) waists when the Bravais lens is inserted into converging the beam exiting the focusing lens 50.

TABLE 1

| SURF | CLEAR APER | AXIAL BEAM | RADIUS | THICKNESS | INDEX Nd | Vd | MATERIAL |
| --- | --- | --- | --- | --- | --- | --- | --- |
| 1 | 1.91 | 1.91 | 16.189 | 3.000 | 1.487 | 84.5 | FK-51 |
| 2 | 1.75 | 1.70 | −16.189 | 1.500 | | | |
| 3 | 1.55 | 1.46 | −13.672 | 2.330 | 1.558 | 54.2 | KZFSN-2 |
| 4 | 1.44 | 1.31 | 70.462 | 8.254 | | | |
| 5 | 0.96 | 0.59 | −6.197 | 2.000 | 1.487 | 84.5 | FK-51 |
| 6 | 0.99 | 0.54 | 6.197 | 3.000 | | | |
| 7 | 1.27 | 0.55 | 16.610 | 4.000 | 1.558 | 54.2 | KZFSN-2 |
| 8 | 1.40 | 0.51 | −16.610 | | | | |

The Bravais lens 200 of the first embodiment has the following characteristics:

In Table 1, the clear apertures, and pupil diameters are based on twice the $$\frac{1}{e^2}$$

diameter of a light beam with wavelength λ=685 nm and waist

The Bravais lens 200 of Table 1 is designed to be apochromatic in a Gaussian beam sense. As stated above, the Bravais lens 200 transforms a (composite) beam waist 210 located 39.15 mm behind its frontmost vertex V into a larger beam waist 230 located essentially in the same plane. (See FIGS. 2A and 2B). The degree of apochromatism can be seen in Table 2. Because this Bravais lens 200 is apochromatic, it requires glasses that have anomalous partial dispersion: FK-51 and KZFSN-2, for example. Other glass choices with anomalous partial dispersions are possible. Such glasses are known to those of ordinary skill in the art of optics. A detailed description of such glasses is provided on page 380–382 of the book "Modern Optical Engineering, The Design of Optical Systems", by W. J. Smith.

In this design, the first, third, and fourth lens element $E_1$, $E_3$, $E_4$ are symmetric for ease of assembly. That is, there is no distinction between a first and rear surface in these lens elements and one can not assemble the lens element backwards. Given the center air thickness of 8.254 mm (between lens group 222 and 224), it is preferred that the focal length efl(1) of the first lens element $E_1$ be approximately equal to the focal length efl(4) of the fourth lens element $E_4$ and, that the focal length efl(2) of the second lens element $E_2$ be approximately double the focal length efl(3) of the third lens element $E_3$. That is: $0.85$ efl $(4) \leq$ efl$(1) \leq 1.1$ efl $(4)$, and $3.0$ efl $(3) \leq$ efl $(2) \leq 4.0$ efl $(3)$.

More specifically, the Bravais lens 200 satisfies the following conditions:
efl (1)/efl=0.35
efl (2)/efl=0.41
efl (3)/efl=0.12
efl (4)/efl=0.31, where efl is a focal length of the Bravais lens 200.

Depending on glass choice, bendings, and center separation, other acceptable design solutions can also be found.

It is noted that the Bravais lenses of the present invention may be used not only in laser printers, but in any other applications requiring imaging of one set of coplanar laser beam waists of different wavelengths to a larger size coplanar set of laser beam waists positioned at the same location as the first set.

The foregoing description is merely exemplary and minor changes and modifications of the invention as described are possible and wholly within the scope of the invention as set forth in the appended claims.

PARTS LIST

| | |
|---|---|
| 2,4 | Photoprints |
| 5 | Laser Printer |
| 10 | Primary Optical System |
| 22,24,26 | laser light sources |
| 40 | fiber optic multiplexer |
| 42 | light beam |
| 50 | focusing lens |
| 52 | beam shaping optics |
| 60 | polygon scanner |
| 70 | f-θ lens |
| 99 | image surface |
| 100 | print medium |
| 200 | Bravais Lens |
| 210,230 | waists |
| 222 | positive lens group of the Bravais lens |
| 224 | negative lens group of the Bravais lens |

What is claimed is:

1. A Bravais lens comprising:
   (i) a front, positive power lens group including a positive power lens element and a negative power lens element; and
   (ii) a rear, negative power lens group accepting light from said front, positive power lens group and including another negative power lens element and another positive power lens element, wherein said front, positive power lens group in combination with said rear, negative power lens group provide said Bravais lens with a negative focal length and a negative power.

2. A Bravais lens according to claim 1 having at least one lens element with an anomalous partial dispersion.

3. A Bravais lens according to claim 1 wherein at least two of said lens elements are symmetrical.

4. A Bravais lens according to claim 1 wherein said Bravais lens is apochromatic.

5. A Bravais lens comprising in order:
   (i) a first, positive power lens group including a first positive power lens element followed by a first negative power lens element; and
   (ii) a second, negative power lens group accepting light from said first, positive power lens group, said second, negative power lens group including a second negative power lens element facing said first negative power lens element of said first lens group and a second positive power lens element facing said second negative power lens element of said second lens group of said Bravais lens.

6. A Bravais lens according to claim 5, wherein $0.85$ efl$(4) \leq$ efl$(1) \leq 1.15$ efl$(4)$ and $3.0$ efl$(3) \leq$ efl$(2) \leq 4.0$efl$(3)$, where efl(1) is the focal length of said first positive power lens element, efl(2) is the focal length of said first negative power lens element, efl(3) is the focal length of said second negative power lens element, and efl(4) is the focal length of said second positive power lens element.

7. A Bravais lens according to claim 6 wherein said Bravais lens is apochromatic.

8. A Bravais lens according to claim 5 wherein three of said lens elements are symmetrical.

9. A Bravais lens according to claim 5 wherein said first positive power lens element is biconvex, said first negative power lens element has a meniscus surface facing said first positive power lens element, said second negative power lens element is biconcave and said second positive power lens element is biconvex.

10. A Bravais lens according to claim 5 having at least one lens element with an anomalous partial dispersion.

11. A Bravais lens according to claim 10 wherein three of said lens elements are symmetrical.

12. A Bravais lens according to claim 10 wherein said first positive power lens element, said second negative power lens element and said second positive power lens elements are symmetrical.

13. A Bravais lens comprising at least three lens elements, said lens elements including at least one positive power lens element and at least one negative power lens element, at least one of said lens element having an anomalous partial dispersion rendering said Bravais lens apochromatic.

14. A Bravais lens consisting:
   (i) a front, positive power lens group including a first positive power lens element and a first negative power lens element;
   (ii) a rear, negative power lens group accepting light from said front, positive power lens group and including a second negative power lens element and a second positive power lens element; and
   said front, positive power lens group in combination with said rear, negative power lens group providing said Bravais lens with negative focal length and power.

* * * * *